Aug. 18, 1959 M. ROSENBERG 2,900,623

MAGNETIC CORE MEMORY SYSTEM

Filed April 5, 1954 4 Sheets-Sheet 1

MILTON ROSENBERG
INVENTOR

BY Lyon & Lyon

ATTORNEYS

Aug. 18, 1959 M. ROSENBERG 2,900,623

MAGNETIC CORE MEMORY SYSTEM

Filed April 5, 1954 4 Sheets-Sheet 2

MILTON ROSENBERG
INVENTOR

BY Lyon & Lyon
ATTORNEYS

MILTON ROSENBERG
INVENTOR

BY Lyon & Lyon
ATTORNEYS

Aug. 18, 1959 M. ROSENBERG 2,900,623

MAGNETIC CORE MEMORY SYSTEM

Filed April 5, 1954 4 Sheets-Sheet 4

MILTON ROSENBERG,
INVENTOR.

BY Lyon & Lyon
ATTORNEYS

United States Patent Office 2,900,623

Patented Aug. 18, 1959

2,900,623

MAGNETIC CORE MEMORY SYSTEM

Milton Rosenberg, Santa Monica, Calif., assignor, by mesne assignments, to Telemeter Magnetics, Inc., a corporation of California Application April 5, 1954, Serial No. 421,031

2 Claims. (Cl. 340—174)

This invention relates to static magnetic memory systems, and, more particularly, to improvements in the construction and operation of magnetic core memory systems.

In an article by J. W. Forrester entitled Digital Information Storage in Three Dimensions Using Magnetic Cores, found in the Journal of Applied Physics, volume 22, pages 44 to 48, January 1951, there is described a coincident current magnetic core memory. A further description of this type of memory is found in an article by Jan A. Rajchman entitled Static Magnetic Matrix Memory and Switching Circuits in the RCA Review, volume 13, pages 183 to 201, for June 1952, and the latest work by Dr. Rajchman on magnetic core memories is found in the October 1953 Proceedings of the IRE entitled A Myriabit Magnetic-Core Matrix Memory, pages 1407 to 1421. These articles describe a magnetic memory consisting of cores of magnetic material capable of saturation in either of two polarities, which may be designated as "P" or "N" and which may be driven from one to the other. The cores usually take the form of small toroids. The preferred hysteresis characteristic for magnetic material of which these cores are made is rectangular. Accordingly, to drive a core from "P" to "N" or vice versa there is a definite minimum or critical magnetomotive force required to be applied, or the core stays where it was before the force was applied. Less than this magnetomotive force can provide some magnetic excursion, but essentially the saturated condition in the particular polarity of saturation remains.

As shown in the articles, these cores are arranged in columns and rows. A different coil is inductively coupled to all the cores in each column. Each of the coils is known as a column coil. A different coil is inductively coupled to all the cores in each row. Each of these coils is known as a row coil. A single reading coil is inductively coupled to all the cores in the memory. Selection of a core for storage of digital information is made by exciting a row coil and a column coil coupled to that core with sufficient current to drive that core to "P" or "N," depending on whether the information sought to be stored is a "1" or a "0." The currents applied to the row coil and the column coil are each less than the critical value. However, any core receiving the effects of these currents coincidently receives a magnetomotive force in excess of the critical value and, therefore, is driven to saturation. For determining the storage condition of a core, drives are always applied to drive it toward a given polarity. If already at this polarity, no voltages are induced in the reading coil, and, if not in this polarity, then a voltage is induced in the reading coil. These concepts are described in detail in the above-noted articles.

It is interesting to note in the articles that these same magnetic cores may also be employed as switches for the purpose of driving a memory. Furthermore, in addition to being suitable for a two-dimensional storage array, the cores may also be used to provide a three-dimensional storage array, wherein a plurality of two-dimensional storage planes are simultaneously driven and inhibiting excitation is used selectively. This permits a word, consisting of a number of binary digits, to be stored in a three-dimensional magnetic memory, one bit being stored in each plane in a corresponding position.

In perusing the literature on magnetic core storage, it will be noted that in almost every instance the highest speed possible is attempted to be attained with these memories. However, if a magnetic memory of this type is considered from a design standpoint, it is found that when this memory is sought to be fitted into an actual high-speed digital computer, the time actually taken to operate the magnetic memory for writing or reading is small, compared to the other operating times of such computer. Hence, it is possible to operate a magnetic core memory at a much lower rate than was originally conceived without decreasing the over-all operating rate of a computer by any noticeable factor.

In the operation of magnetic matrices, it is noted that as the size of the matrix is increased the ratio of desired to undesired signal at the output of the reading coil is reduced. When reading coils are checkerboarded, i.e., the sense of the winding on each core is reversed and all the cores selected are chosen to have extremely uniform characteristics, a first order of cancellation is achieved. However, with an increase in the matrix size, the number of uniform cores required is increased. Since the art has not yet reached the point where cores can be made uniformly in every instance, either a large and costly number of rejects is obtained, or the matrix size attainable rapidly approaches a limit, or the uniformity requirements for the cores is reduced, with consequent complexities in driving and reading circuitry, in order to overcome the effects produced by the reduced uniformity requirements. One of the effects is to require absolutely uniform driving currents. The current applied to the cores may be more readily maintained uniform if vacuum tubes are employed and the drive is direct. Uniform driving currents are difficult to obtain using magnetic switch drives. It is preferred to employ switch drives, however, as they are much cheaper and more reliable in reducing the number of vacuum tubes employed.

When a core in a memory is driven, as by either a column coil or a row coil excitation, it has a magnetic excursion. When the drive is removed, it does not return to the same magnetic position from which it originally started, but it may return to a position in a slightly less saturated region. Successive partial drives can cause successive and different magnetic excursions. These effects are due to the core traveling around different minor hysteresis loops with the different excitations. These are known as the delta effects, and can be found described in detail in an engineering report by E. A. Guditz entitled Delta in Ceramic Array No. 1, E488, October 14, 1952, which is obtainable from Massachusetts Institute of Technology. Cores in a memory, which are not selected but which are in a row and column in which a selected core is included, receive the partial drives and, accordingly, are not left in the same magnetic positions. When reading is desired, as briefly described previously, the selected core is driven, and the presence or absence of an induced voltage in the reading coil is indicative of the condition of the selected core. However, with delta effects, amongst others, voltages are induced in the reading coil from the partial driven cores which are not canceled by the checkerboarding of the reading winding which can become sufficiently large to mask the signal from the selected core.

In a copending application for a Magnetic Core Memory System, filed April 5, 1954, Serial Number 421,142, now Patent No. 2,862,198, by Raymond Stuart-Williams, Matthew Arnold Alexander, and this applicant, there is described and claimed a system for minimizing adverse effects including delta effects. This includes utilizing a rectangular array for the cores and scheduling the application of current drives to the row and column coils, so that one comes on first and any disturbances caused by that one being applied are allowed to subside before the second drive is applied. This type of programming permits the employment of a different type of reading coil than those employed heretofore. This reading coil is the subject of the present application. As mentioned in the previously referred to article by Dr. Rajchman, the winding of the various coils on the cores is an extremely difficult and tedious operation. The reading coil is one of the most difficult and time consuming windings to apply to a magnetic core memory, because of the necessity for checkerboarding or reversing the sense of the winding on every core in progressing through the matrix. Not only are unwanted voltages induced in the reading coil as a result of half drives of the core, but also as a result of pickup through the air. The checkerboarding is aimed at compensating for the effects of half-driven cores by bucking out the unwanted induced voltages against each other.

It is an object of the present invention to provide a reading coil which is simpler to wind in a magnetic core memory than those employed heretofore.

It is a further object of the present invention to provide a reading coil for a magnetic core memory which is wound to minimize air pickup.

It is still a further object of the present invention to provide a reading coil for a magnetic core memory which is simpler than those used heretofore.

These and other objects of the invention are achieved by providing a reading coil for a magnetic core memory consisting of series connected windings on the cores in which the connections are such as to provide an interlaced re-entrant reading coil wherein there are an equal number of windings of both senses in any one row of cores and the windings have the same sense in any column of cores. This type of reading coil is usable where cancellation of induced voltages from half-driven column cores is not required, as no reading operation occurs until after any disturbance caused by the drive of a column coil has subsided.

The novel features that are considered characteristic of this invention are set forth with particularity in the appended claims. The invention, itself, both as to its organization and method of operation, as well as additional objects and advantages thereof, will best be understood from the following description when read in connection with the accompanying drawings, in which:

In the following description of the magnetic memory core system, for convenience in description, a row coil may be referred to as the "Y" line of the matrix and the column coil may be referred to as the "X" line of the matrix. By "row coil" is to be meant the coil coupling all of the cores in a given row in a matrix. By "column coil" is to be understood, similarly, the coil coupling all of the cores in a column of the matrix. The "reading coil" is the coil coupling all of the cores in the matrix so that driving one or more of the cores induces voltages in the reading coil. By "delta effect" is meant, as previously stated, the effects caused by cores traveling on different minor hysteresis loops with different drives.

Figure 1:
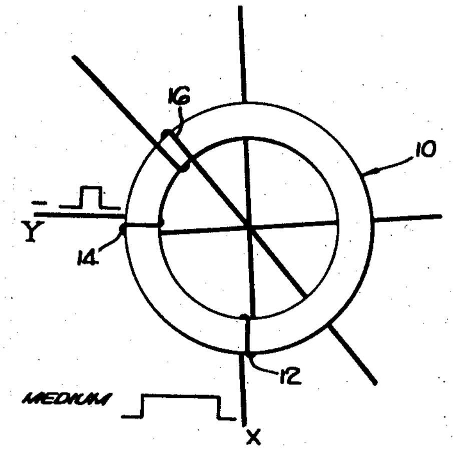
Figure 1 represents a core and its associated windings in a magnetic memory matrix.

*The principles of the proposed system.*—The presently known principle of operation of magnetic core matrices requires that two equal current pulses should be coincident at a selected core, the sum of the currents being sufficient to change the state of the core, while one pulse alone is insufficient. If maximum speed of operation is required, these pulses should be as short as possible and exactly coincident. Considerable thought has been given in the past to ensure exact time coincidence. However, if time is not too important, one pulse may be much longer than the minimum possible value. This pulse is established first, the shorter pulse occurring later. Figure 1 shows a toroidal storage core 10 of a type suitable for use in a magnetic matrix memory. The core has three windings 12, 14, 16 inductively coupled thereto. One winding 12 is part of a column coil or "X" line, a second winding 14 is part of a row coil or "Y" line, and the third winding 16 is part of the reading coil used in a magnetic memory. A long pulse is applied to the X line of the matrix and a short pulse is applied to the Y line during the long pulse.

Figure 2:
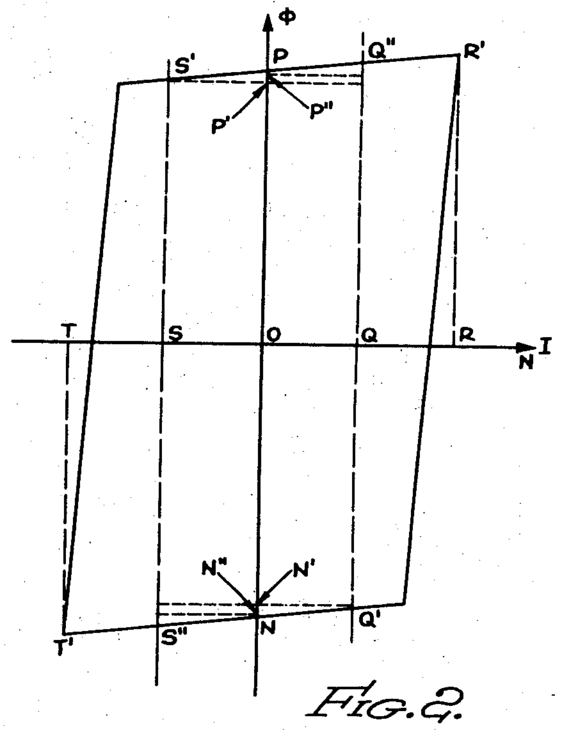
Figure 2 represents a typical hysteresis characteristic shown for the purpose of assisting in the explanation herein.
Figure 3:
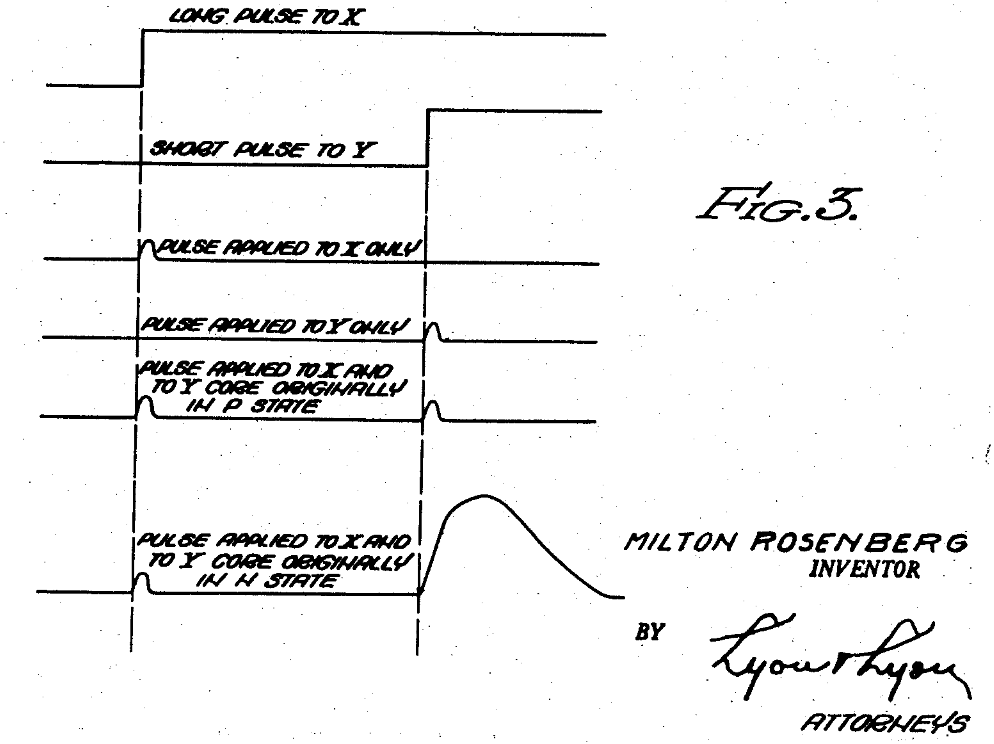
Figure 3 represents typical wave shapes obtained in a reading coil in a matrix excited by long and short pulses.

A typical hysteresis loop of a storage core 10 is shown in Figure 2. The core is said to be storing "0" if at state P or to be storing "1" if at state N. The magnitude of the magnetomotive force, or M.M.F., provided by the X or Y line is represented by amount "0Q." Provided the turns are fixed, the M.M.F. can be expressed in terms of the current flowing in the wires. If a single pulse of current is applied to the core, it will move first to Q′ or Q″, depending on whether it was storing at N or P. When the pulse is released, it will move back to the axis to a point very near N or P. Since the top and bottom portions of the loop are not exactly horizontal, some output will appear in the reading winding as a result of these excursions. If now both pulses are applied, the pulse will move first to Q′ or Q″, as before. When the Y pulse commences, the core will move to R′. When the Y pulse finishes, the core will move to Q″, and when the X pulse finishes, the core will move to P. If the core was originally at P, the excursion Q″R′ will occur during the Y pulse. This will produce a signal in the reading coil that is approximately equal to that produced by a PQ″ movement. If the core was at N, the excursion Q′R′ will occur during the Y pulse. This will cause a very large signal output. Thus, the only time at which a large signal can be produced in a selected core is during the Y pulse and if the selected core was storing in state N. The pulses occurring in the reading coil are illustrated in Figure 3. This shows the X pulse or column coil pulse, the Y pulse or row coil pulse, the effects of the single application of these pulses in the reading coil, and the effects of the combined application of these pulses when a core is in P and when a core is in N.

This process of driving a matrix makes it possible to separate the occurrence in time of the disturbing pulses due to the X selection and those due to the Y. If now, reading is commenced at the beginning of the Y pulse after any disturbance due to the X pulse has finished, only those cores on the selected line in the Y direction cause disturbance. In a square array, only half the energized cores contribute to the disturbance, and, therefore, the undesired signal at the output due to nonuniformity of the cores is reduced by 2 as this is a random effect. This always assumes that the normal compensating type of reading winding has been employed, for example, the checkerboard in which the windings on alternate cores are arranged so that disturbing signals of opposing polarity are induced therein and hence tend to cancel each other. The delta effect, however, increases linearly with the number of cores disturbed, and, therefore, this is reduced by two.

In a large matrix, the delta effect is more important than errors due to nonuniformity, and, therefore, the more important quantity is reduced by the major amount. This improvement can be made larger still by making the matrix rectangular instead of square. For example, a 4096 bit matrix can be assembled either as 64 by 64, 128 by 32, 256 by 16, and so on. If, now, the longer pulse drives the line linking the greater number of cores and the shorter pulse drives the line with the smaller number of cores, the disturbance is reduced still more.

If more time is permitted, the long X pulse should rise very slowly. The output occurring during this pulse is then very small as the rate of rise of current and, hence, output voltage is small. Thus the early pulses can be completely neglected. This has an additional advantage that the voltage drop in the X windings is small, simplifying the problem of driving the large number of cores on this winding which is inherent in the use of the rectangular matrix.

In reading the output obtained in a reading coil, the method of strobing, or reading the voltage induced in the reading coil after amplification and rectification during an interval after the transients occurring as a result of partial drive and air pickup have subsided and before the voltage induced by driving the selected core has subsided, was a method that found, and still finds, great favor. However, when it is desired to go to a three-dimensional storage system of the type described by Forrester, the control circuits required to generate accurately timed strobing pulses for the many parallel memory planes of the system becomes extremely cumbersome. In addition, circuits which are required to produce an accurately controlled time delay are inherently unreliable. It is preferable, in order to avoid these limitations and difficulties, to integrate the signal from the reading winding in a manner so that the output from the integrator represents the flux excursion of the cores.

Using integration, the reading system is not time dependent. One system of integration is described in the article by Rajchman. The theory behind integration may be understood from the following explanation. Referring now to Figure 2, again there is shown an idealized rectangular hysteresis loop. OS represents a negative half magnetomotive drive; OT represents a negative full magnetomotive drive. By half and full M.M.F. drives are meant, respectively, the drives due to current in either the X or Y line and the drive due to currents in both lines concurrently.

The main basis of this form of reading is that if a core is storing at N and receives a ½P current and then a ½N current, it moves first to Q′ and then to N′, back to the SS″ line, and, finally, to N″. A similar action takes place if a core is at P′ and receives a ½P—½N cycle. During this and any subsequent action, these minor loops tend to close, i.e., N″ is very near N. The closure of this loop improves as more ½P—½N cycles are applied, and, after five or six cycles, the loops are so nearly closed that it is not possible to detect any error.

Hence, if integration proceeds over two beats or a cycle of ½P—½N, the signal due to disturbed cores is effectively zero.

Figure 4:
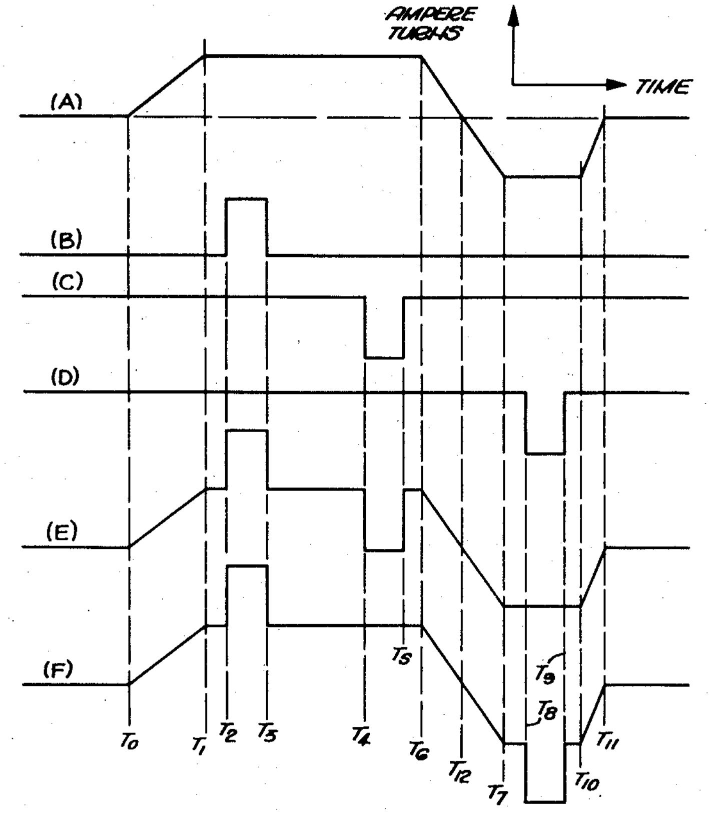
Figure 4 represents the current waveforms required for operating a matrix in accordance with a preferred program embodying the invention.

Figure 4 shows the current waveforms applied to the X and Y lines to achieve a preferred method of operation of a magnetic matrix memory.

Waveform A is applied to a selected X wire. It commences at time $T_0$ and rises slowly to its maximum possible value by time $T_1$. Its rise time may be on the order of a turnover time of a core. It then remains at this value, producing a magnetomotive force represented by OQ in Figure 2 until time $T_6$. The duration of the plateau time of waveform A is on the order of a multiple of the turnover time of a core. It then changes from its maximum positive value to its maximum negative value, producing a magnetomotive force represented by OS in Figure 2 by time $T_7$. It then remains at this value until time $T_{10}$, when it decays to zero by the final time $T_{11}$. The negative portion of the waveform may be substantially the same in duration, amplitude, and rise time as the positive portion, or it may even have a shorter duration for reasons appearing later.

Waveform B is applied to the selected Y line between times $T_2$ and $T_3$. $T_2$ follows $T_1$ by a time sufficient to allow all disturbance due to the application of waveform A to have subsided. This is usually on the order of the turnover time of the cores used. The amplitude of the pulse is equal to that of the positive part of pulse A. The duration, $T_2$ to $T_3$, is sufficient to allow the selected core to move from state N to state P completely, this being on the order of the core turnover time.

A time delay $T_3$ to $T_4$ allows sufficient time to complete the reading process and to transfer the information determining whether the core is to be set to P or N.

If it is desired to leave the core at P, a current pulse C is applied to the Y line during times $T_4$ to $T_5$. This pulse has exactly the same characteristics as B, except that it is negative going. The time $T_5$ to $T_6$ is inserted to reduce the requirement for accurate timing.

If it is desired to reset the core to N, pulse D is applied to the Y line instead of pulse C. This pulse has the same shape and amplitude as pulse C. Its duration $T_8$ to $T_9$ is less than $T_7$ to $T_{10}$ to remove the need for accurate timing.

The magnetomotive force applied to the selected core, if it is finally set to P, is shown in waveform E. The magnetomotive force applied to the selected core when it is set in N is shown in waveform F.

The force applied to an unselected core on a selected X line may be represented by wave shape A. The force applied to an unselected core on a selected Y line may be represented by wave shapes B and C or B and D. Hence, any energized unselected core receives equal forces in both directions during the cycle. By an unselected core is meant a core which is inductively coupled to either an energized column coil or row coil but not to both. The core coupled to both is a selected core and will be driven to P or N as shown by wave shapes E or F.

Reading is commenced in the cycle at time $T_2$ and finishes by time $T_4$. Hence, only the disturbance due to the Y current pulse is read, since by the time the reading commences the disturbance due to the application of the X current pulse has subsided.

One important advantage of this system for driving cores is that cores need to be uniform in any single Y line only, as this is the place in which disturbances are significant. This has two results. First, a large number of grades of cores may be used so that all good storage cores may be incorporated in the equipment. In fact, the acceptance figure is 80 percent, rather than 25 percent, for previous methods of using cores. Secondly, the cores in any Y line may be made extremely uniform, so uniform, in fact, that nonuniformity effects can be neglected. When this method of driving the cores is employed for a rectangular matrix having, for example, more columns than rows, with the X drive being applied to the column coils and the Y drive to the row coils since there are fewer cores in each row, the number of required uniform cores is considerably reduced.

Consider the case of a core being set to P employing the X and Y drives represented, respectively, by wave shapes A and B. By time $T_1$, the core has moved either to Q′ or Q″ in Figure 2, depending on whether it was at N or P to begin with. By the time $T_3$, it is at R′. By the time $T_4$, it is at Q″. By time $T_5$, it is at P. It then returns to Q″ and then through to S′ by time $T_{10}$. By time $T_{11}$, it has moved to P′.

In a similar manner, a core being set to N finally ends at N. Hence, P′ and N are the initial storage points. In accordance with this method of driving, any subsequent disturbances of the core when it is not in the selected position are of the ½P—½N type. A core at N will move to N″ under the influence of the first disturbance. During the ½P portion of the cycle, a core at N moves from N to N′, a core at P moves from P′ to P″. However, the original drive action and any subsequent disturbances are symmetrical. Hence, P′P is equal to N′N. Since P′ is very near P, P′P″ is very nearly equal to NN′. This equality will improve with subsequent disturbances. Hence, if the cores are chosen in pairs and the reading coil is wound so that the voltage output of each member of the pair is induced in an opposing manner in the reading coil, the output from them will be zero if both cores are in the same state and PP″ if they are in opposite states. It is known that this amount is very small.

As a result of use of unequal pulse-length drive systems, the following advantages are obtained:

(1) The ratio of desired to undesired signal at the output of the reading winding is increased because:

*a.* The contribution due to the X cores is neglected;

*b.* By making the matrix rectangular effect, "*a*" can be increased;

*c.* Errors due to nonuniformity can be neglected, as it is only necessary to keep all cores in each Y line uniform. Hence, high uniformity is possible; and

*d.* In the preferred program, due to the inherent symmetry of operation of the cores, the delta effect is reduced.

(2) The reduction in over-all matrix core uniformity afforded by this system allows one to utilize a larger percentage of manufactured cores than heretofore possible.

Figure 5:
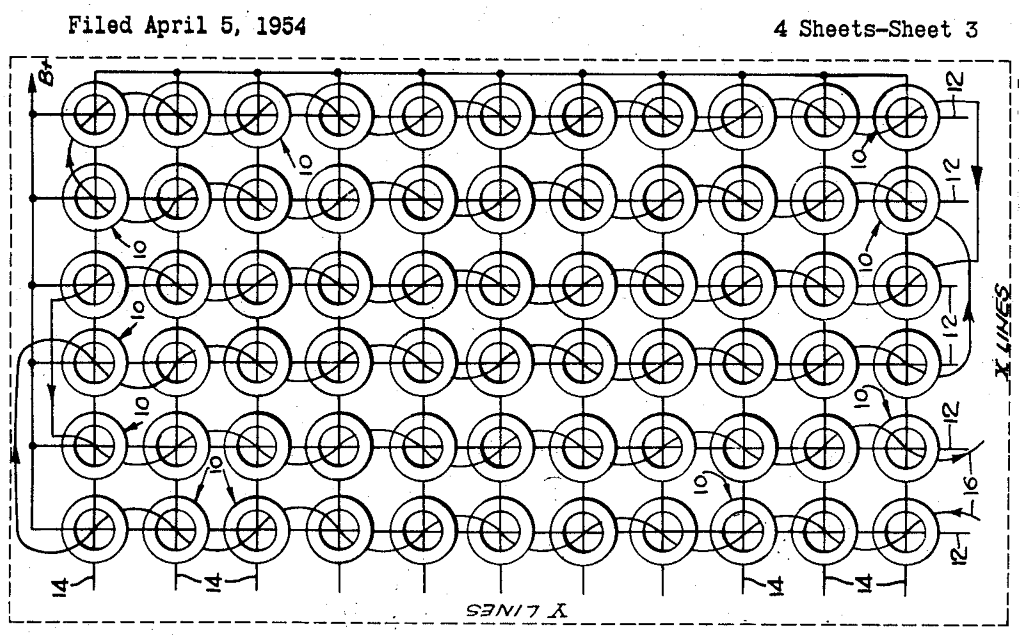
Figure 5 is a schematic diagram of an embodiment of the invention for a magnetic core matrix shown by way of example.

Referring now to Figure 5, there will be seen by way of example a schematic diagram of an embodiment of the invention comprising a small magnetic core matrix memory in a rectangular array. The X drive is applied to a selected one of the column coils 12 and the Y drive is applied to a selected one of the row coils 14. A core 10 coupled to the excited X and Y line or row and column coil is the desired core. Current is applied to the coils either from vacuum tubes or magnetic switches (not shown), as desired. As indicated previously it is preferred, with the program herein described, to apply current to the column coils using vacuum tube drives and to apply current to the row coils using a magnetic switch drive. A reading coil 16 is interlaced in the memory. It is coupled to all the cores.

Since reading occurs, in accordance with the program herein described, only after the disturbance caused by application of the column coil current has subsided, a great saving in time and effort in constructing the memory is afforded. One of the most difficult windings to insert in the memory is the winding required for the reading coil. Heretofore, double checkerboarding, that is reversing the reading winding sense with every core, was required with programs where both X and Y drives occurred simultaneously in order to cancel the disturbances caused by both drives. In view of the programs described in the subject embodiment of the invention, checkerboarding is required only in the Y direction, since there is no X disturbance at the time of reading. This simplifies winding the reading coil tremendously. This means that the winding sense of the series-connected reading coil windings which are on every core can be the same. That is, the winding turns go through every core in the same direction. If a single turn is used to couple to the cores, then the single turn will go through each core in the same direction. However, by connecting one end of a first column of series-connected reading windings to one end of the adjacent or, preferably, a third column of series-connected reading windings, and then the other end of the third column of series-connected windings to the other end of a fifth column of series-connected windings, and so on, and then returning to pick up the even-numbered columns, any voltages induced in the reading coil by half-driven cores in any single row will cancel.

Figure 6:
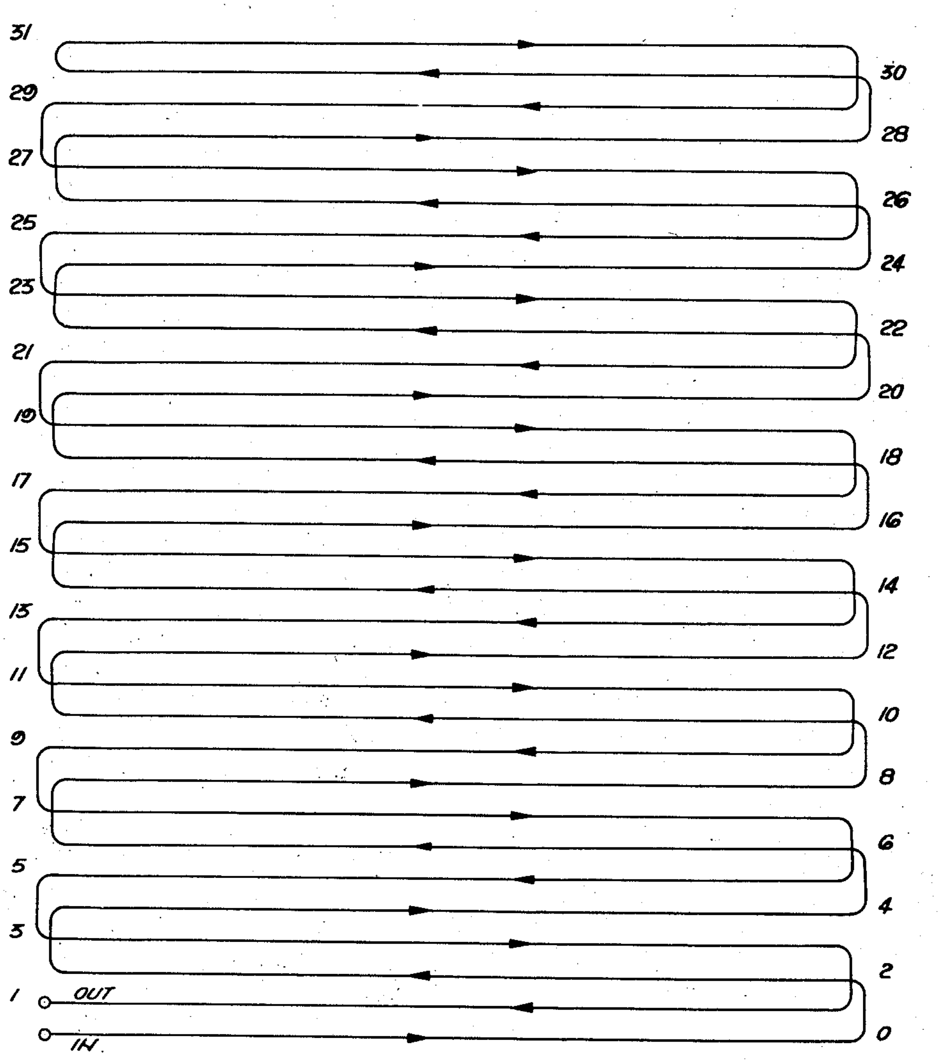
Figure 6 shows a schematic of a winding pattern for a reading coil in accordance with this invention.

Referring now to Figure 6, there may be seen a schematic diagram for a winding pattern for a reading coil for a memory in accordance with this invention. Since the sense of the winding is the same on each core, the series of windings comprising a reading coil are represented as straight lines. The arrowheads on the lines show the direction of current flow for any single voltage induced in the reading coil. It should be appreciated that, because of the re-entrant manner of the interconnection of the columns of series-connected windings, air pickup is minimized.

If the columns of the matrix are numbered from 0 to 31 commencing with the column on the left, the winding goes up through all the cores in column 0 in one sense, comes down through column 2, up through column 4, thus lacing back and forth through all the even-numbered columns. When column 30 is reached, the winding is next laced through column 31 and then interlaced through the odd-numbered columns to be brought out at column one. This eliminates air pickup in the Y direction, due to the fact that the reading winding is normal to drive from the row coils. Furthermore, a convenient terminal point for the reading coil is provided, since the amount of pickup is reduced when connecting the coil through a twisted pair of wires to other apparatus.

Figure 7:
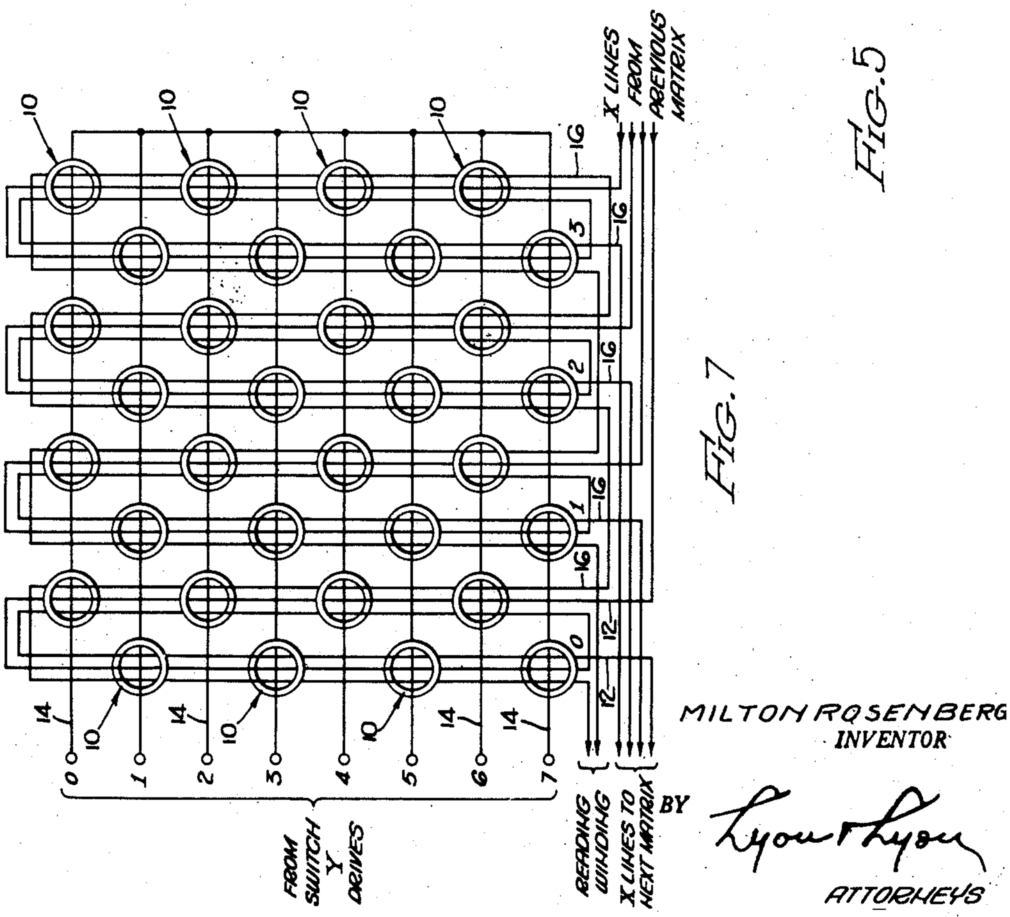
Figure 7 is a schematic diagram of a magnetic core memory showing a different core disposition but embodying the principles of a rectangular array.

In order to show the reading winding more clearly, reference is made to Figure 7, which is a schematic drawing of a 4 x 8 matrix. The columns are "folded over," as it were. In other words, instead of a column consisting of eight aligned cores 10, it consists of four of the eight cores disposed alongside of and in an offset manner from the other four cores. However, each column coil 12 still winds through all eight cores in series. The advantage of this form of core layout is that it permits easier assembly, smaller and noninductive winding arrangements, and the bringing out of all X lines to one side. There are two column coil turns through every core, one row coil turn, and one reading coil turn. The reading coil 16 goes up through the cores in column zero (up through the core hole in the first four cores and up through the hole in the last four cores) through the cores in column two, through the cores in column three, and back through the cores in column one. If the sense of the reading winding is examined in an X direction, it will always be the same. If the sense of the winding is examined in the Y direction, it will be "checkerboarded," i.e., voltages induced from all the cores in a row will oppose and cancel each other. If a memory in three dimensions is desired, then a plurality of these core planes may be employed with the corresponding X lines of all the core planes being connected in series and the Y lines being brought out to a side.

Circuitry for generating the long and short pulses for driving the memory and for returning a core to its condition before reading are not shown herein, since these circuits are well known and are described, for example, in the previously referred to application by Stuart-Williams, Alexander, and this applicant. The reading coil herein described may be used in a core memory whether it is rectangular or square, the only limitation being that the reading coil is checkerboarded in the direction of the memory drive which causes disturbances upon reading, and is not checkerboarded in the direction of the memory drive which does not cause any disturbances upon reading. The tremendous simplification of applying the reading coil which comprises the invention herein to a memory, where all that has to be remembered is that the sense of the winding on every core is the same, should be contrasted with prior art reading coils, where winding sense was altered with every core.

Accordingly, there has been described and shown herein a novel, useful, and simple reading coil for a magnetic matrix memory of the type wherein, upon reading, disturbances are caused from only one of the two required drives to a core and not by the other.

I claim:

1. In a magnetic matrix memory system of the type including a plurality of cores of magnetic material having substantially rectangular hysteresis characteristics, said cores being arrayed in columns and rows, a plurality of row coils each of which is coupled to all the cores in a different one of said rows, a plurality of column coils each of which is coupled to all the cores in a different column, and means for applying current pulses to a column coil and to a row coil coupled to a selected core to drive said selected core to saturation at a desired polarity, said current pulses being applied to said column coil sufficiently before the application of said current pulses to said row coil to permit disturbances caused thereby to subside, a reading coil for said magnetic matrix comprising a winding on every core, the sense of said windings being the same on every core, means connecting the windings on each core in each column in series, means connecting one end of alternate ones of said series connected column windings to each other, means connecting one end of the next to last of said series-connected column windings to one end of the last of said series-connected column windings, and means connecting other ends of alternate ones of said series-connected column windings to each other to form a reading coil for said matrix.

2. In a magnetic matrix memory system of the type including a plurality of cores of magnetic material having substantially rectangular hysteresis characteristics, said cores being arrayed in columns and rows, a plurality of column coils each of which is coupled to all the cores in a different column, a plurality of row coils each of which is coupled to all the cores in a different row, and means for applying current pulses to a column coil and to a row coil coupled to a selected core to drive said selected core to saturation at a desired polarity, said current pulses applied to said column coil being applied sufficiently before said current pulses to said row coil to permit disturbances caused thereby to subside, a reading coil for said magnetic matrix comprising a winding in one sense on each core in said matrix, means connecting all said windings in each column in series to form a plurality of column windings, means connecting alternate ones of said column windings in series to provide a reading coil interlaced in a re-entrant manner through said memory there being an equal number of windings of both senses in all the cores in any row.

References Cited in the file of this patent

UNITED STATES PATENTS

| | | |
|---|---|---|
| 2,691,154 | Rajchman | Oct. 5, 1954 |
| 2,691,155 | Rosenberg | Oct. 5, 1954 |

OTHER REFERENCES

"Digital Memory Systems," by I. L. Auerbach, published in "Electrical Mfg.," vol. 52, Issue 4, pages 100–107 October 1953.